United States Patent [19]

Leblang et al.

[11] Patent Number: 4,809,170
[45] Date of Patent: Feb. 28, 1989

[54] COMPUTER DEVICE FOR AIDING IN THE DEVELOPMENT OF SOFTWARE SYSTEM

[75] Inventors: David B. Leblang, Wayland; Gordon McLean, Jr., Acton; Howard Spilke, Shrewsbury; Robert P. Chase, Jr., Boston, all of Mass.

[73] Assignee: Apollo Computer, Inc., Chelmsford, Mass.

[21] Appl. No.: 45,180

[22] Filed: Apr. 22, 1987

[51] Int. Cl.[4] .................... G06F 3/00; G06F 15/06
[52] U.S. Cl. .................... 364/200; 364/300
[58] Field of Search ............. 364/300, 200 MS File, 364/900 MS File

[56] References Cited

U.S. PATENT DOCUMENTS

| | | | |
|---|---|---|---|
| 4,227,245 | 10/1980 | Edblad | 364/468 |
| 4,232,370 | 11/1980 | Tapley | 364/478 |
| 4,309,756 | 1/1982 | Beckler | 364/300 |
| 4,315,315 | 2/1982 | Kossiakoff | 364/300 |
| 4,398,249 | 8/1983 | Pardo et al. | 364/300 |
| 4,455,619 | 6/1984 | Masai | 364/900 |
| 4,533,997 | 8/1985 | Furgerson | 364/200 |
| 4,536,840 | 8/1985 | Borta | 364/300 |
| 4,558,413 | 12/1985 | Schmidt et al. | 364/200 |
| 4,567,574 | 1/1986 | Saadé et al. | 364/300 |
| 4,646,229 | 2/1987 | Boyle | 364/200 |
| 4,734,854 | 3/1988 | Afshar | 364/200 |

FOREIGN PATENT DOCUMENTS 2127188  4/1984  United Kingdom ............ 364/300

OTHER PUBLICATIONS

D. B. Leblang et al, *Computer-Aided Software Engineering in A Distributed Workstation Environment*, ACM SIGPLAN/SIGSOFT Symposium on Practical Software Development Environments (Apr. 1984), pp. 1-15.

*Primary Examiner*—Raulfe B. Zache
*Assistant Examiner*—Ayni Mohamed
*Attorney, Agent, or Firm*—Hamilton, Brook, Smith & Reynolds

[57] ABSTRACT

A support system for Computer-Aided Software Engineer (CASE) applications provides configuration management and features such as transparent retrieval of named versions of program sequences on a line by line basis as well as task monitoring and reporting. A modification record is maintained for all changes to the modules in the system build library by version numbers. Any version of a module can be obtained on a line by line basis as well as several different versions simultaneously thus supporting multiple concurrent system work on different versions by multiple users. Module monitoring is provided whereby if a module is modified when it is being monitored, all persons who might be affected thereby are notified. Task monitoring also provides notification and monitoring of tasks being accomplished as well as "blueprints" to follow in the future for the accomplishment of the same or similar tasks.

20 Claims, 6 Drawing Sheets

COMPUTER DEVICE FOR AIDING IN THE DEVELOPMENT OF SOFTWARE SYSTEM

This is a continuation of co-pending application Ser. No. 725,700 filed on Apr. 22, 1985, now abandoned.

BACKGROUND OF THE INVENTION

For many years, there was no such thing as automated "configuration management" in relation to computer software. At first, there was nothing of a software nature having a configuration to be managed. As the early software "systems" were developed, documentation and control of the "current version" was most often accomplished as a de-facto manual configuration management in the manner shown in FIG. 1. A system was built, tested, the components revised and the system rebuilt. It was then installed and any future changes made by way of "patches" which were, in turn hand written as generally indicated at 10 in FIG. 1 onto the program listing 12 of the system as originally built and installed.

More recently, however, Computer-Aided Software Engineering (CASE) environments are becoming not only helpful but, in many instances, essential for complex software projects, just as Computer-Aided Design (CAD) systems have become essential for complex hardware projects. The phrase "software engineering environment", while used in many contexts, generally refers to an operating system environment and a collection of tools or subroutines. It is in this context that the term is used herein.

A few well know prior art CASE systems are:

UNIX/PWB—designed to run on AT&T's UNIX programming environment, includes the SCCS source code control system and the MAKE configuration tool.

RCS—a more powerful source code control system that also runs on UNIX systems.

CMS and MMS—the Digital Equipment Corp. VAX/VMS equivalent to SCCS and MAKE. CMS provides a richer set of source control capabilities than does SCCS or RCS; MMS is virtually the same as MAKE. SCCS/MAKE, RCS, and CMS/MMS work with the standard compilers, editors, and debuggers found on the host system.

ALS—the Ada Language System, was developed to meet the Stoneman requirements for an Ada programming support environment. ALS includes an Ada compiler, debugger, binder, and execution environment. In addition, the ALS has a source code control system that keeps successive generations and variants of packages. The ALS does not have a single configuration management tool, but provides the primitives needed to build one. The ALS Ada compiler/linker detects the need to recompile (as required by the Ada standard).

Cedar—built on the Xerox PARC Computer Science Laboratory system. Although the Cedar system does not provide for source code control, it does allow several copies of a module to exist, each stamped with a date/time. The Cedar "System Modeller" is a configuration management tool that notices when a new version of a module comes into existence (via coordination with the editor), and can build a complete program from an arbitrary set of module versions. Cedar requires that only the Cedar editor and compiler be used.

CONFIGURATION MANAGEMENT BACKGROUND

MAKE looks at each item in a "makefile" and finds its "date/time modified" entry (DTM). If the DTM of an object pre-dates the DTM of any of the objects it depends on, the object is rebuilt. This DTM based approach is fine when you are trying to build a system from all "most recent" sources; but, it fails to deal with the more typical, more complicated cases involving old versions, variant branches, or multiple targets. Moreover, MAKE is very "binary" oriented; the user must describe the system in terms of the object modules that go into it, rather than in terms of the source modules. MAKE supports a dynamic style of development, in which each user sees other users' changes as soon as they become available.

The Cedar "system model" allows users to name specific versions of files (basically by giving the desired creation date). This allows Cedar to rebuild old systems, and to let individual users build their own versions. Cedar is source oriented; that is, the model is given in terms of source modules and the Cedar builder module goes off and searches for the binary, if any, that corresponds to the requested version of the source. If no binary is found, Cedar will re-build it from the source. Cedar supports a cautious style of development in which each user is isolated from other users' changes until an explicit request to incorporate someone else's changes is made.

Most of the steps taken to accomplish a task modify elements, but not only program module elements. For instance, adding an enhancement to a system may also require updating the system's design specification, user manual, and on-line "help" files. Some steps may involve off-line activities such as giving a talk about the enhancement, constructing floppy disks for the enhanced system and telephoning customers. In short, the software development process involves much more than just programming. Therefore, a practical software development environment should support more than just programming.

For more details on CASE systems of others and related matters in general, the reader is directed to the following publications:

D.B. Leblang, et al.
"Computer-Aided Software Engineering in a Distributed Workstation Environment"
ACM/SIGPLAN/SIGSOFT Conference on Practical Software Development Environments, Apr 1984. (Copy filed herewith)
Source Code Control System User's Guide
UNIX System III Programmer's Manual, Oct. 1981.
CMS/MMS: Code/Module Management System Manual
Digital Equip. Corp., 1982.
S. I. Feldman
"Make—A program for Maintaining Computer Programs"
Software Practice and Experience, Apr. 1979.
N. Habermann, et al.
The Second Compendium of Gandalf Documentation
CMU Comp Sci Dept, May 1982
P. Heckel
"A Technique for Isolating Differences Between Files"

CACM, Apr. 1978.
Several Papers
 Software Eng. Sym. on High-Level Debugging
 ACM/SIGSOFT/SIGPLAN, Aug. 1983.
E. L. Ivie
 "The Programmer's Workbench"
 CACM, Oct. 1977.
P. Leach, P. Levine, B. Dorous, J. Hamilton, D. Nelson, B. Stumpf
 "The Architecture of an Integrated Local Network"
 IEEE Journal on Selected Areas in Communications, Nov. 1983.
D. B. Leblang
 "Abstract Systax Based Programming Environments",
 ACM/AdaTEC Conf. on Ada, Washington D.C., Oct. 1982.
B. Lampson, E. Schmidt
 "Organizing Software in a Distributed Environment"
 SIGPLAN Jun. 1983.
B. Lampson, E. Schmidt
 "Practical Use of a Polymorphic Applicative Language"
 10th POPL Conf., Jan. 1983.
L. J. Osterweil, W. R. Cowell
 "The TOOLPACK/IST Programming Environment"
 IEEE/SOFTFAIR, Jul. 1983.
E. Sandewall
 "Programming in an Interactive Environment: The "LISP"Experience"
 Computing Surveys, Vol 10, No 1, Mar. 1978.
Collected papers
 Tutorial: Software Development Environments
 IEEE/COMPSAC-81, Nov. 1981.
"STONEMAN: Requirements for Ada Programming Support Environment"
 U.S. Department of Defense, Feb. 1980.
R. Thall
 "Large-Scale Software Development with the Ada Language System"
 Proc. of ACM Computer Science Conf., Feb. 1983.
W. F. Tichy
 "Design, Implementation and Evaluation Of a Revision Control System"
 6th Int'l. Conf on Software Eng., Sep. 1982.
T. Teitelbaum
 "The Why and Wherefore of the Cornell Program Synthesizer"
 SIGPLAN, Jun. 1981.
W. Teitelman, L. Masinter
 "The Interlisp programming environment"
 Computer, Apr. 1981.
W. Teitelman
 "Cedar: An interactive programming environment for a Compiler-Oriented Language"
 LANL/LLNL Conference on Work Stations in Support of Large Scale Computing, Mar. 1983.

While prior art CASE systems as described above and otherwise have offered an order of magnitude improvement in the ability to keep track of various configurations of software systems as they are built and modified, they all have limitations which prevent them from doing a really first-rate job. The major drawback is shown in FIG. 2. In basic terms, the problem is one of a lack of "transparency" and "concurrency" to users in the area of configuration management. The Master program source codes 14 (i.e., the basic or first versions of the programs) are maintained in a Master Table 16. Changes by version 18 are maintained in a Versions Table 20. The various possible versions of a program (or system comprising multiple programs) are not transparently available to users. Thus, for example as depicted in FIG. 2, to build a given configuration of a system the System Builder 22 cannot request in sequence and line by line the versions of the programs to be used in the system build. Rather, as shown, control must first be given to a Version Maker 24 along with designators of the version of programs to be placed in a holding area 26. The Version Maker 24 then accesses the Master Table 16 to obtain the master program source(s) 14 and then gets and applies the version changes 18 from the Version Table 20. The modified program(s) reflecting the designated version(s) is then placed in the holding area 26. At that time, control is finally transferred to the System Builder 22, which gets its input from the holding area 26 from which it "builds" the desired system in the build area 28. As used throughout this specification, the term "build" is used to mean all the processes well known to those skilled in the art including compilation, linking, etc. As can be realized, there are many shortcomings from such an approach. In addition to the lack of transparency and inconvenience it causes, there is also a high cost in lost time and space. Moreover, unless multiple holding area 26 and attendant complex procedures for their use are provided, there is a lack of concurrency in that only one version of the system can be built at any one time. Since the System Builder 22 gets its input stream from the holding area 26 and the build area 28 is capable of handling one build at a time, any attempt for more than one user to build a system concurrently will result in failure. If both attempt to get their source codes into the holding area 26 simultaneously, the result will be an input stream to the System Builder 22 which is a combination of the two—producing an incoherent system to both users. If one gets his/her source into the holding area 26 first, the subsequent build of the second could totally overwrite the resultant system in the build area 28 such that both users would be working with the system of the second. Of all the drawbacks and limitations of the prior art systems, this lack of easily used concurrency is probably the most serious.

Another shortcoming of prior art configuration management systems is the lack of any capability to track and report progress on tasks or to monitor and notify of changes in areas critical to others.

Wherefore, it is the object of the present invention to provide a CASE system providing transparent access to multiple versions, the ability to build different configurations concurrently without interference, and additional monitoring and reporting capabilities not found in known CASE systems.

SUMMARY OF THE INVENTION

The above-described objects have been accomplished by the CASE system of the present invention comprising computer means for executing pre-established logic sequences and for reading from and writing to memory; source code memory means for holding basic source code versions of system program modules, each comprising a plurality of sequential statements, and for holding for each module an incremental delta record or sequence of modifications to the source code of the module each modification defining a different version of the module and being identified by a version number; build list means for designating a sequence of the modules to be used to build a software system; version list means for designating the version of each of the modules to be used to build the software system; version designation means for dynamically designating the version number of a module currently being employed during the building of the software system; GET statement logic sequence means to be executed by the computer means for accessing the source code memory means and for providing on request the next statement in sequence of a designated system program module according to the version currently designated by the version designation means; derived object pool memory means for receiving and holding compiled modules of the software system as the system is being built; and system build logic sequence means to be executed by the computer means for obtaining from the build list means and the version list means a sequence of modules by version numbers to be used to build a software system, for periodically setting the version designation means to reflect the version number of a module to be currently compiled by any compiler supported by the computer means, for sequentially accessing the GET statement logic sequence means to sequentially obtain the proper version of the modules on a statement by statement basis from the source code memory means, and for using the module statements to build and link the desired systems comprising the designated modules and versions thereof in the pool memory area.

In the preferred embodiment the system build logic sequence means includes logic to use the most recent version of a module if no version number is designated by the version designation means.

The preferred embodiment additionally comprises bound configuration memory means for holding build histories of built software systems as Historical Records. The system build logic sequence means, as part of the building of each system, creates a build history in the bound configuration memory means comprising a list of the modules and versions employed to build the system; each build history is identified by a unique Historical Record identifier. The preferred embodiment additionally comprises build list designation logic sequence means to be executed by the computer means for accessing the bound configuration memory means and using a corresponding one of the Historical Record build histories to set the build list means and the version list means to designate the version of a module of a to-be-built system, such designation recreating a prior system from only the unique History Record identifier.

In the preferred embodiment, the bound configuration memory means includes a unique identifier for associating each compiled module created by the compiling of a version of a system module with an entry on the system build logic sequence; and the system build logic sequence means, as part of the building of each system, creates a build history in the bound configuration memory means comprising a list of the system modules and versions employed to build the system, and the above-described unique identifier. Additionally, the system build logic sequence means, as part of the building of each system, checks prior Historical Records for each entry on the system build logic sequence and utilizes a previously created compiled module corresponding to an entry rather than utilizing the source code for the entry to create the compiled module; the previously created compiled module exists within the pool memory means.

To provide the desired concurrency, the pool memory means is adapted to have a plurality of systems built within it at one time; and, the system build logic sequence means is adapted to concurrently employ a plurality of the build list means and the version list means to build a plurality of the software systems within the pool memory means simultaneously.

To improve speed of system building, the system build logic sequence means, as part of the building of each system, checks the Historical Records for each entry on the current system build logic sequence being used for the build and utilizes a previously compiled module corresponding to an entry rather than utilizing the source code for the entry when a compiled module exists within the pool memory means.

Additionally, the Historical Records include last time used means for indicating the last times compiled modules have been utilized; and purge logic sequence means are provided for periodically checking the last time used means and for purging from the pool memory means the compiled modules that have not been utilized within a preset period of time.

Additionally the preferred embodiment may have module modification logic sequence means to be executed by the computer means for modifying modules in the source code memory means by adding to the incremental delta record of modifications; monitors associated with selectable modules of the source code memory means, the monitors designating notifications to be made when modifications are made to the modules which have been selected for monitoring; and, module monitoring logic means for establishing module monitoring information and notification designations of the monitors, for interfacing with the module modification logic sequence means, and for making notifications according to the designations of the monitors when a modification to a respective module being monitored is made.

DESCRIPTION OF THE PREFERRED EMBODIMENT

The novel CASE system of the present invention is incorporated in DSEE (for DOMAIN Software Engineering Environment) which is a distributed, production quality, software development environment that runs on workstations manufactured and sold by the assignee of this application under the registered trademarks APOLLO and DOMAIN and where the workstations (or "nodes" ) are designed to operate as part of an interconnected ring network of multiple nodes. DSEE provides source code control, configuration management, release control, advice management, task management, and user-defined dependency tracing with automatic notification. It incorporates and utilizes the novel features to be described hereinafter.

DSEE is implemented as one program, with instances running at various nodes in the network. It is designed to manage large-scale software development efforts involving engineers, technical writers, managers, and field support personnel. Since these organizations, and their data, are typically spread among many locations, DSEE recognizes and supports distributed development environments. The underlying Apollo DOMAIN architecture helps by providing network-wide virtual address space, transparent remote file access, and remote paging. DSEE uses a distributed database management system (DBMS) to store historical information; reliable, immutable files to store deltas and tasks; server processes that watch for asynchronous events; and a store and forward inter-process communication mechanism which is used in case the network becomes temporarily partitioned. The DOMAIN system also supports multiple windows, each of which may run a separate process. Some windows provide general system commands through a standard shell; others run dedicated applications like MAIL and CALENDAR. In the DOMAIN system, DSEE runs as a dedicated window that provides commands for activities directly related to software development.

A DSEE product goal requires that it work with any language or text processor; in addition, that users be able to pick any editor. As will be seen, in order to accomplish its various objects, parts of DSEE were incorporated into the operating system. Thus, without changes to any existing tools, the compilers, editors, print spoolers, etc. are all able to understand DSEE file formats and obey DSEE Configuration Manager version constraints. This powerful capability distinguishes DSEE from all of the prior art systems described above under Background of the Invention.

Figure 3:
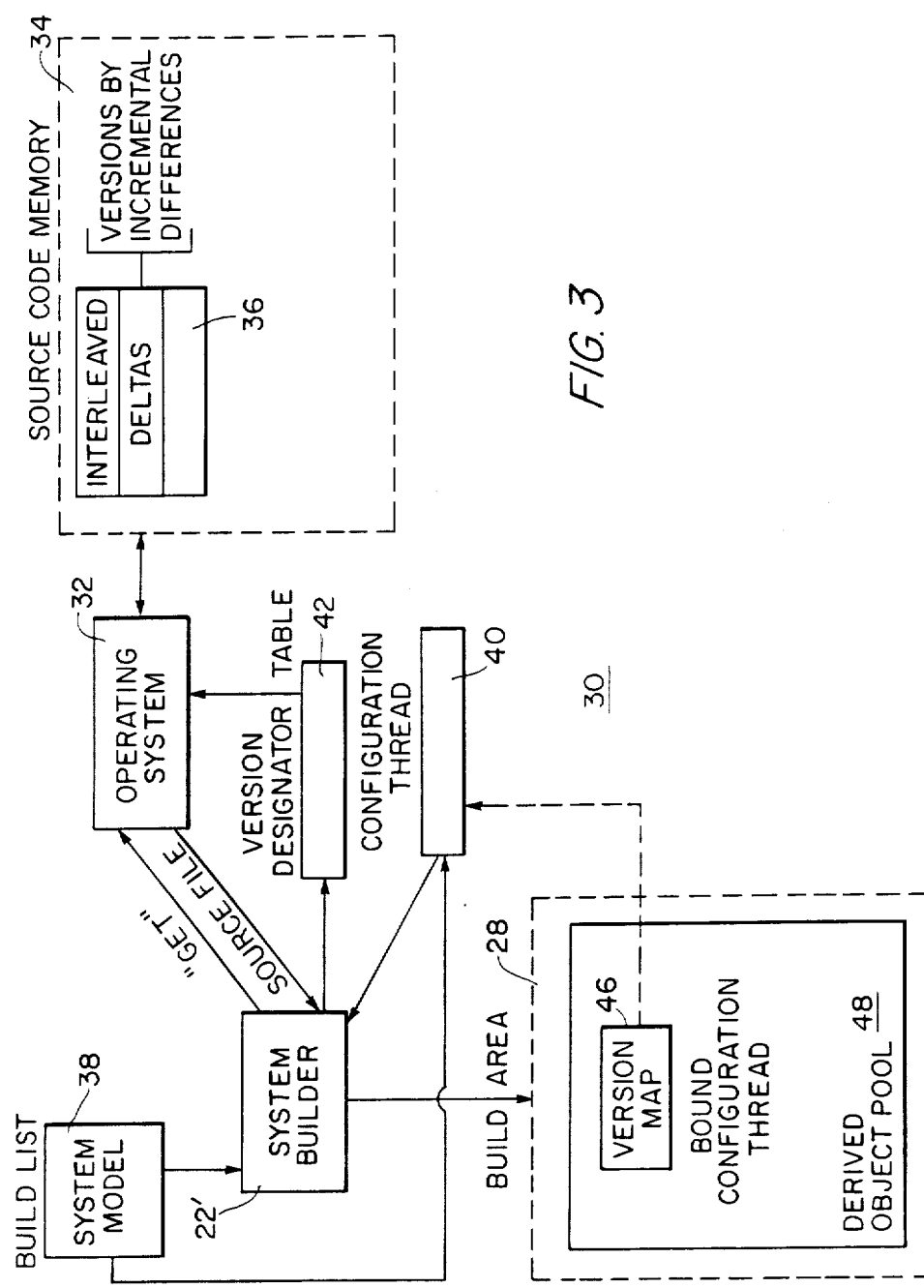
FIG. 3 is a simplified block diagram of the basic system of the present invention wherein the system builder is able to fetch any desired versions of programs to be used in a system build on a line by line basis as the system build takes place and, additionally, produce and manage multiple versions of derived objects.

The heart of the present invention is shown in simplified block form in FIG. 3. The basic operation and goal thereof will first be described, after which, a detailed description of the present invention, as incorporated into the tested CASE system DSEE, will follow.

Being a computer-based system so as to provide the advantages thereof, the present invention resides in a computer 30 which is adapted to execute pre-established sequences of logic statements (i.e., programs and/or firmware) and to read from and write to memory. The central control resides in the logic of the operating system 32. To achieve the objectives of the present invention, many of the logic features to be described hereinafter were incorporated into the operating system 32. The operating system of many computers provides the "GET FILE" function whereby a program running under the operating system can get a source file by requesting it from the operating system. As will be seen hereinafter, the implementation of the GET function in the operating system 32 of the present invention provides a unique capability that permits the entire CASE system to perform in a manner heretofore not possible in the systems of the prior art.

The system of the present invention contains a source code memory 34 wherein the program listings in source code of the various modules to be employed in system building are maintained by incremental differences; that is, the source code memory 34 contains entries 36 for each module by so-called "interleaved deltas", which permits the identification on a line by line basis of each statement of a module according to a designated version on one pass through a source module entry 36.

The system builder logic 22' of the present invention builds the system into build area 28' as a function of the statements received from the operating system 32 on a line by line or statement by statement basis as the build is taking place. To designate what modules and versions are being used in a particular system build, the system builder logic 22' can employ several sources. A build list 38 comprising system models can be employed to designate the particular sequence of modules to be employed. A configuration thread 40 establishes the version of each module to be employed. To provide maximum flexibility, the system builder 22' (or one of several others to be discussed later) dynamically sets a version designator table 42 which is used by the operating system 32 to determine which statement to return in response to a GET request as the build progresses.

Figure 1:
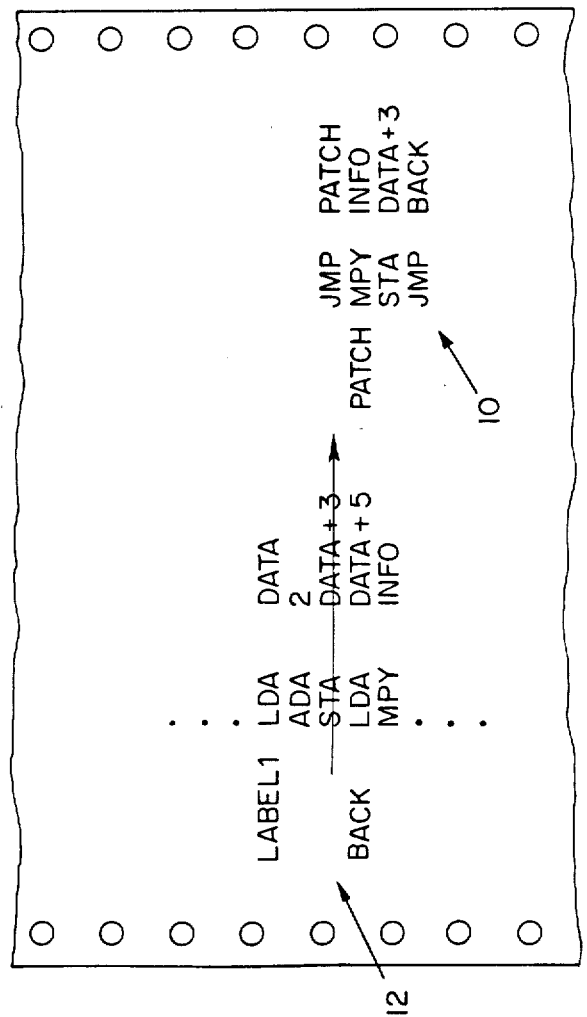
FIG. 1 is a simplified drawing of a prior art approach to configuration management wherein changes after system build are accomplished by patches to the physical programs which are, in turn, documented through handwritten notations of the program listing.
Figure 2:
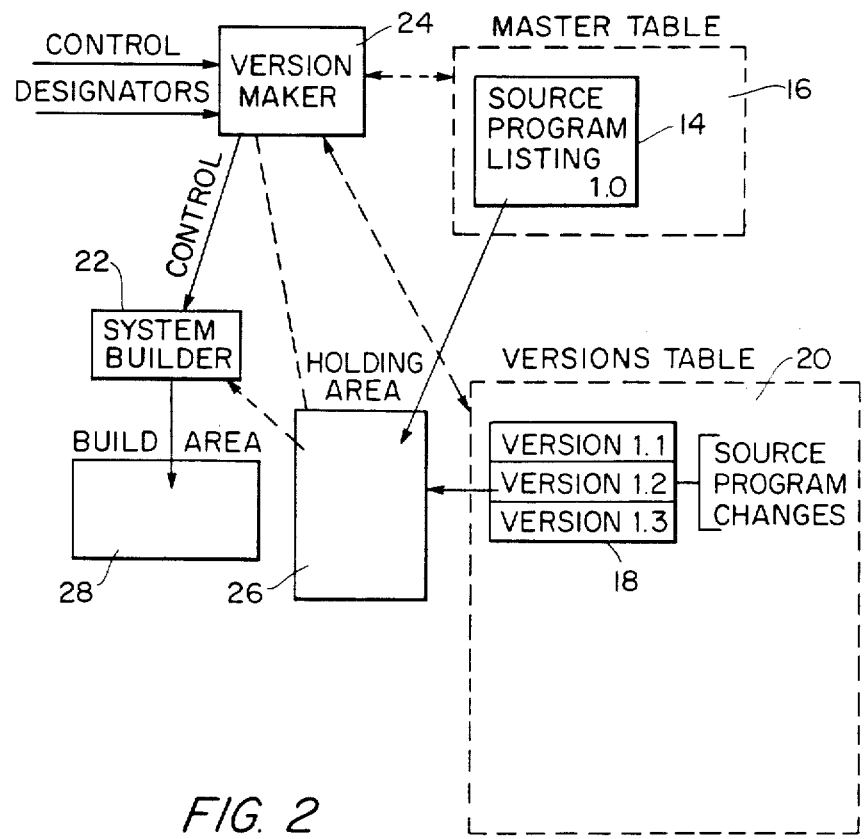
FIG. 2 is a simplified block diagram of a prior art, non-transparent approach to system building where the versions of programs to be used in a system build are first assembled into a holding area subsequently used as the input stream for the system build.

As will be developed in the detailed description which follows, the build operation results in some historical data which identifies the exact versions of source modules used in the build. It can also be printed out for historical records purposes and can then be used to recreate the build at a later time should it be desired to do so. In this regard, a build version specification referencing historical records is constructed during the build. A bound configuration thread or version map 46 is actually created within the build area 28 prior to the build and used to perform the build. Following the build, the version map 46 is maintained in the build area in order to identify the version used in the build and for recreation purposes should they ever arise. Note that as opposed to the prior art system described with respect to FIG. 2, the build area 28 of the present invention is an enlarged area into which several builds can be taking place simultaneously with various versions so as to provide the desired concurrency.

Finally, as the system is primarily source code oriented, to provide speed of operation in instances where certain modules are used on a frequent basis, a derived object pool 48 is maintained as cache memory also within the build area 28. Currently used versions (not necessarily the "most recent") of modules in object code form are maintained in the pool 48. The version map or bound configuration thread 46 describing each object is also stored in the pool and associated with the modules in object code form. This speeds up the time to get an object code version of a commonly used module since it can be found in pool 48 rather than being translated from source into object code form. Since space for this purpose is limited, versions in pool 48 which are not being constantly used are periodically purged to make room for others. Note also that in order to provide the necessary access to the modules in the derived object pool 48, each entry is identified by its version number, as well as date and time of creation, so that each entry can be uniquely recognized through the associated bound configuration thread of the version map 46.

Turning now to the specifics of the CASE system according to the present invention as commercially produced by the assignee of this application, DSEE consists of several "managers" (control units within the computer 30):

The History Manager controls source code and provides complete version histories.
The Configuration Manager builds user requested software systems from their components and detects the need to rebuild any components.
The Task Manager relates source code changes made throughout the network to particular high-level activities.
The Monitor Manager watches user-defined dependencies of components and alerts users when such dependencies are triggered by modifications of a related component.
The Advice Manager holds general project related information and provides templates for re-doing common tasks.

History Management

The History Manager (HM) provides source code control within the DSEE environment. The HM is a reserve/replace and incremental change (delta) oriented system. Related source elements or modules are grouped into DSEE libraries like the source code memory 34. Source elements are stored in a special, highly-compressed format (described in greater detail hereinafter). Users reserve an element for modification and edit a local copy. When they have finished changing and testing the element copy, users replace the element, creating a new version. The HM inquires about the reasons behind a change, then records that information, along with the date/time, node or workstation id, and person's name in the history database associated with the library. At a later time, the history of an element can be reviewed, specific changes viewed line by line, and any past version to the element retrieved. If a user attempts to "reserve" an element that is already reserved, DSEE warns the user of the conflict by stating why the element was reserved and by whom. Parallel development is allowed, but only on distinct branches (see the description of "variant branches" hereinafter).

In a distributed workstation environment there are various instances when the DSEE managers need to be informed that a new version is created. For this reason, the DSEE process creating the new version sends interprocess communication messages to other nodes. The descriptions of the Task and Monitor Managers contained hereinafter discuss this feature in more detail.

Another aspect of a distributed environment is that "partial" failures can occur. DSEE provides reliable recovery for partial failures. The distributed DBMS used by the HM uses journal files and semaphores to implement transactions. The HM updates delta files within the transactions by creating unnamed temporary files, force writing them to disk, and then making them named permanent files.

An element/module in the DSEE source code libraries normally evolves along a linear line of descent. DSEE, however, supports three types of variant evolution. The first type of variant evolution answers the problem of what to do when a bug is discovered in a previous release of a certain version of an element. The maintainer wants to modify the old version of the element without affecting, or being effected by, current development activities. The DSEE HM provides a mechanism for creating a new, independent, line of descent for the element that branches off an existing version in the source library. On a large project, some users may work exclusively on branches, while others continue to develop the main line of descent. Just prior to a new release, the branch may be merged into the main line, thus incorporating bug fixes into the main development work. DSEE provides a multi-window interactive merge command that automates much of the merging process. The user can override an automatic merge decision or make edits to the resulting file as the merge proceeds.

DSEE is a host/target oriented system; that is, it assumes that the software code being developed is intended to be executed on a variety of target machines, not just the machine which hosts the software development environment. The second type of "variant" allows for alternate, radically different implementations of the same module. This is a requirement of some projects; for example, an I/O control module may have one implementation in 68000 assembler language and another in PDP-11 assembler language. The ALS of prior art provides "variation sets" to deal with exactly this problem. DSEE relies on the Configuration Manager and Monitor Manager, described hereinafter, to solve this problem. DSEE users can create two distinct elements and let the Configuration Manager pick the right element based on the current configuration description listed in the version map. The Monitor Manager ensures that when one implementation of a source code element is changed, the user is notified of dependent or related implementations which then require changing too.

The third type of variant arises when alternate implementations are subtly different and may be implemented in a single source code element with embedded conditional compilation statements. Again, the Configuration Manager is relied upon to pass the appropriate flags to the compiler based on the current configuration description. With this approach, most of the source elements are shared and so changes made in the common sections of an element affect all target variants.

Technical Notes on History Management

While some prior art systems such as ALS and Cedar store full copies of old versions of elements, because DSEE was intended to support large systems over a long period of time, and on moderately sized disks, DSEE was designed, like RCS and SCCS, to store only the incremental difference (delta) between successive versions of a source code element/module.

The use of deltas saves an enormous amount of space. Statistics on typical Pascal modules managed by the HM showed that each new version makes the delta file about 1%-2% larger. In other words, 50-100 versions of a module can be stored in the same amount of space as two copies of that module. These space savings answer the challenge of those who say that source code control systems use too much disk space and that users should just keep each module and a current backup copy.

In addition to deltas, DSEE saves space by compressing leading blanks in source files to a space count byte. Again, the savings are enormous. Statistics on Pascal modules held by the HM showed that 20% of each module consists of leading blanks. The combination of deltas and space compression leads to an interesting phenomenon: a typical History Management element, with five to ten versions, is often smaller than a single clear text copy of that element.

DSEE/HM, like SCCS, uses "interleaved" deltas; that is, there is only one file containing all of the versions of an element. Intermixed control records allow the source code control system to extract any version of the element in a single pass over the file. By comparison, RCS uses "separate" deltas; that is, a whole, plain text copy of the most recent version is kept along with deltas describing how to go "backwards" from the current version to old versions. RCS can provide the most recent version very quickly, but has more trouble implementing variant branches. DSEE uses a variant of the delta algorithm. This choice was made for functionality reasons, not for performance. The ability to construct any version of an element in a single pass over the interleaved delta file is a critical feature in the implementation of DSEE "extended streams". Extended streams is the single most important novel aspect of the present invention and provides ordinary, unmodified programs transparent access to any version of a DSEE element. No prior art CASE system offers this important advantage.

DSEE's element history files, like all file system objects in the Apollo DOMAIN system, are stamped with an object type unique identifier (UID). For each object type there exists a corresponding Stream Manager implementing standard stream operations on objects of that type (e.g. OPEN, CLOSE, GET RECORD, PUT RECORD, SEEK, etc).

When the Apollo DOMAIN I/O subsystem is asked to open a "stream" on a system object, it allocates and initializes a file-descriptor and then dispatches to the file descriptor, based on the object's type UID, to the appropriate Stream Manager to complete the "OPEN". The DSEE History Manager's File Stream Manager determines and records the desired version number in the file-descriptor. The default is the "most recent" version in the main line of descent; however, a global version map can be used to indicate that some alternate version is desired. As subsequent calls are made to obtain the next record from the file, the DSEE Stream Manager is invoked to implement DSEE-specific behavior, which includes applying deltas and determining the next record in the desired version. The Version Maps, set-up by the DSEE Configuration Manager, are described hereinafter.

DSEE Configuration Management

The DSEE Configuration Manager (CM) supports both cautious and dynamic styles of software development. The DSEE CM employs the novel concept of combining a "System Model", which is read as the blueprint for the construction of a software system, with a stand-alone "version specification", which is used to dynamically define the version of each module in the software system to be used during a particular system build. This is in contrast to prior art systems which employed a single, specific module/version designation list for the build or a System Model employing an implied "most recent" designation with respect to the versions of each module. It is this novel dynamic flexibility which gives the present invention the concurrency capability which has heretofore escaped implementation with prior art CASE systems.

A DSEE System Model is a description of: the components (i.e. modules) that comprise an application/system to be built, the "build" dependencies inherent in each component, and the build rules that must be applied to each component in order to rederive an object module from the source code of that module. The CM considers a component's "build dependencies" to be the set of objects that are relevant to the rederivation of the component (e.g., "include files"). The System Model does not state which versions to use in a build; it simply defines the static properties of the application to be built. The System Model may reference elements in several DSEE HM libraries as well as non-DSEE modules. The DSEE System Model is generally source code oriented; that is, for the most part, binaries or object codes are not mentioned in the model. Instead, binaries are referred to as the result of translating (compiling) the corresponding source codes. The System Model language supports multi-step derivations and translators that have multiple outputs as well as flow of control constructs for type 2 and 3 variants.

Figure 4:
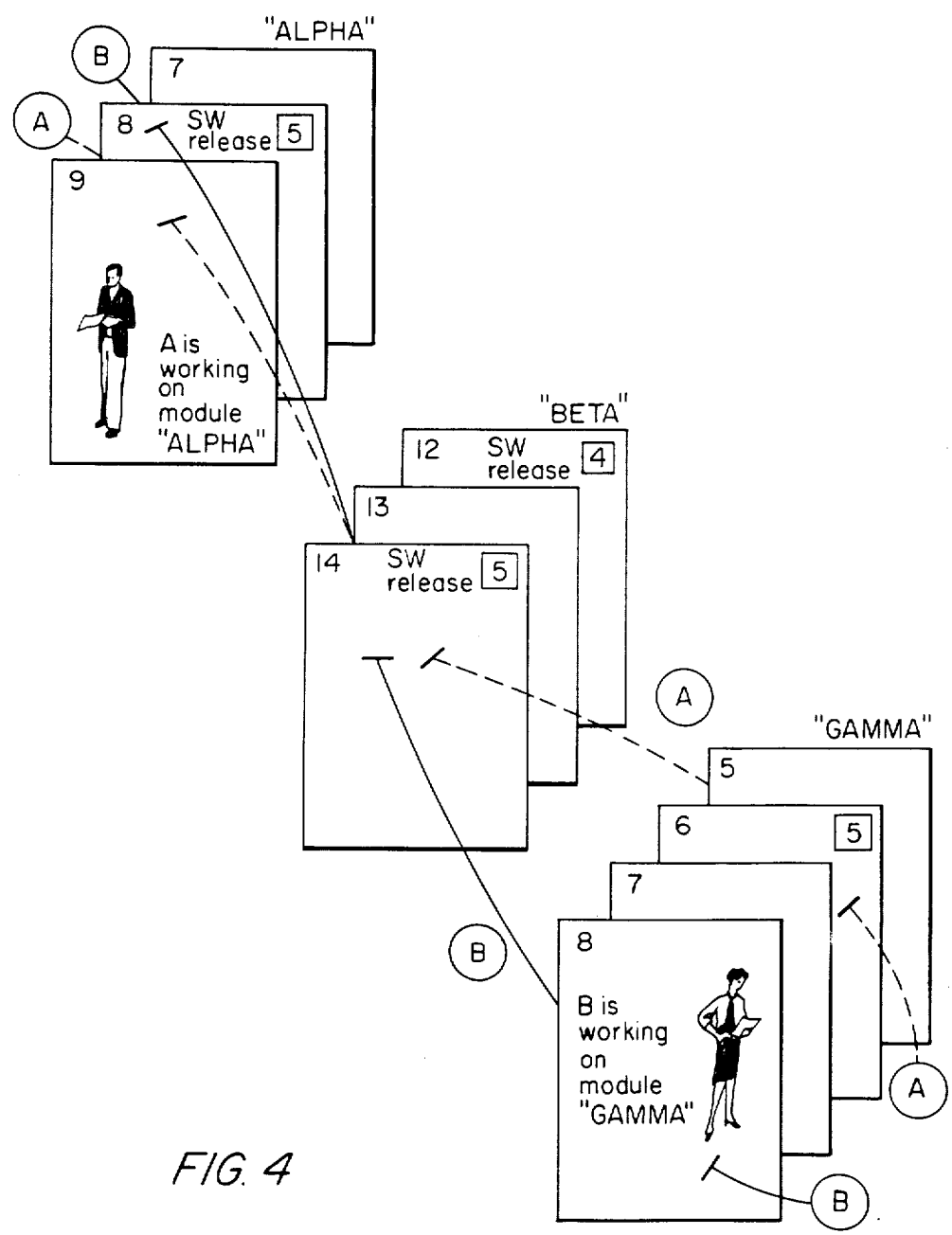
FIG. 4 is a representation of how multiple threads through different versions of program modules can be used by different programmers simultaneously when using the system of the present invention for software development.

A DSEE Configuration Thread (CT) states which version of each component/module named in the System Model should be used for a build. An example of configuration threading is shown in FIG. 4. As can be seen, by using DSEE according to the present invention, programmers A and B can be working on different threads simultaneously which are comprised of the versions required by the particular programmer. The CT is very flexible. That is, it may state version information very explicitly (i.e., "for this build use version 2.2"), or in more dynamic terms (i.e., "for this build use MOST RECENT version"). Wildcard patterns are allowed, as are variant branch specifications and reserves. To that end, the CT is of a rule-based language, such that for each component in the system model, the CT rules are evaluated in order, the first rule that applies is used. At build time, the CT is evaluated and used to "bind" the components in the System Model to particular versions. The fully bound object called a bound configuration thread is similar to an expanded CT or System Model with versions filled in, in that all components and dependencies are listed, the versions are given explicitly, and the default translator rules are filled in. This Bound Configuration Thread (BCT) is used to perform the build. The BCT used in a build is a valuable record of that build, since it lists the actual versions of all constituent components and includes files for all of the components in the System Model. The BCT also lists the translator command lines used. A BCT may refer to another BCT. This happens when a component is built from the results of translating other components; e.g., the BCT for a program refers to the BCT of each of the modules that comprise it.

Building Programs with the DSEE CM

As described earlier, the CM maintains a Derived Object pool which holds several object code versions or binaries of each source element compiled as the result of building the components named in the System Model. Each Derived Object in the pool is associated with the BCT used to build it. When asked to build a component of a system, the CM determines a "desired" BCT by binding the System Model to the versions requested by the user's current CT. The CM then looks in the Derived Object pool contained in the build area to see if there is a BCT that exactly matches the one desired. If a match is found, the derived object in the pool associated with that BCT is used. Otherwise, the component is rebuilt in accordance with the desired BCT, and the new derived object and BCT are written to the pool. In all cases, the user is given exactly what he asked for.

Releasing Software

In addition to a number of binaries and BCT's, each build results in a Build Version Specifier. A user can list all existing Build Version Specifications. Given a Build Unit Specifier, DSEE can find the BCT in the pool that corresponds to that build. A release consists of the system that was built, its BCT, and keywords that describe the system. These items are stored in a safe, stable database. Optionally, a shapshot of source code and derived objects can be made. DSEE can perform various checks by analyzing the BCT; for example, it can warn when more than one version of the same element is used. Later, when a bug is reported in a released version of the system, the maintainers can use keywords to locate the version in the database and find the BCT—which will describe the exact versions used in the system. Since the History Manager has all of the old sources, users can base their CT on the BCT of the release, thereby re-establishing the environment that existed when the release was made. By making minor edits to an explicit CT, users can fix bugs without disturbing most modules of the system.

DSEE can create a shell in which all programs executed in that shell window transparently read the exact version of an element requested in the user's Configuration Thread. The History Manager, Configuration Manager, and extensible streams mechanism (described above) work together in this way to provide a "time machine" that can place a user back in an environment that corresponds to a previous release. In this environment, users can print the version of a file used for a prior release, and can display a read-only copy of it. In addition, the compilers can use the "include" files as they were, and the source line debugger can use old binaries and old sources during debug sessions. All of this is done without making copies of any of the elements.

Technical Notes on Configuration Management

Because maintenance and development proceed in parallel on a large project, the Derived Object pool will contain binaries that correspond to a previous release as well as binaries used for current development. Over time, a large number of binaries can accumulate. As a consequence, the Derived Object pool may contain binaries that no one requests anymore because they are too old, or binaries that have been superseded by new development. Since the DSEE History Manager holds in the DSEE source libraries the sources needed to reconstruct any binary, a binary may be safely deleted from the pool. In DSEE, a house-cleaning algorithm is performed periodically to check binary usage and discard binaries that haven't been used in a long time.

The Version Designator Table 42, mentioned earlier, provides the DSEE Stream Manager with per-element version information. When a component must be rebuilt, the DSEE CM sets the Version Designator Table 42 to reflect the version of each subcomponent to the component listed in the desired BCT. Then, the CM executes the build command declared for the component in the System Model. When subcomponents are opened by the DSEE Stream Manager, it consults the Version Designator Table 42 to determine which version of the subcomponent should be read.

Users need the Configuration Manager to ensure the consistency of their systems, and they expect to pay for the added safety by sacrificing some performance. In this regard, the DSEE CM maintains several caches to improve rebuild performance. For example, a "latest version" cache is used to speed the resolution of CT references to "most recent" versions. Other performance improvements are gained by using hash values to cut down on the number of pool objects that must be examined when the CM is trying to match a desired BCT against the BCTs in the pool.

Task Management

Figure 5:
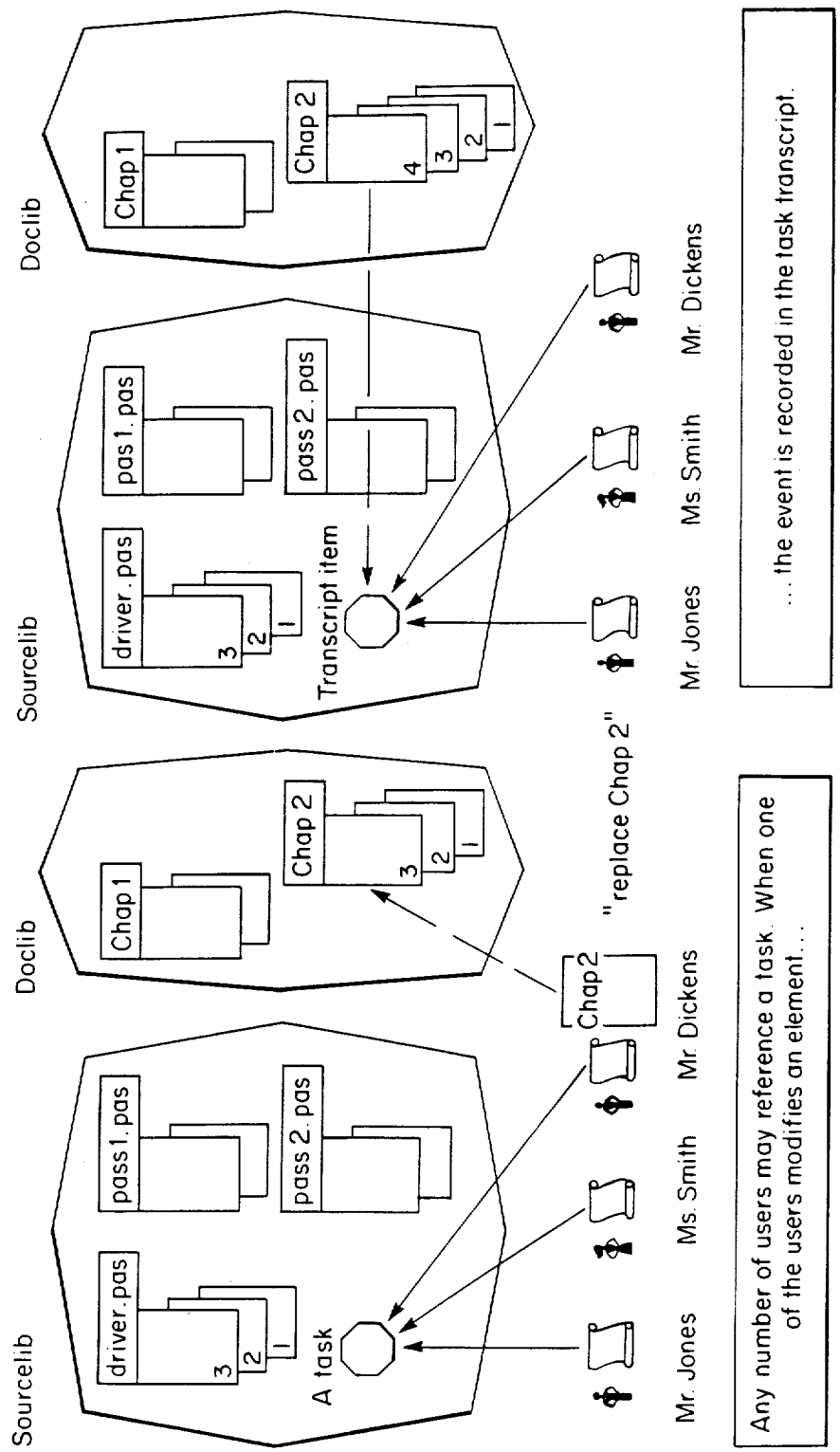
FIG. 5 is a representation how the task monitoring aspect of the present invention operates.

The DSEE History Manager provides a convenient way to record descriptions of the modifications to an element/module when a new version is created. In large systems, however, there are few modifications which affect only a single element. Most significant enhancements and many "bug fixes" require changes to several elements. It is desirable to have a mechanism for remembering all of the modifications which were performed as part of one higher-level Task. This concept is shown in FIG. 5. Often, it is also desirable to inform other users of changes to modules of a particular system which could affect them. The additions to the basic system of FIG. 3 required to perform the monitoring, notification, and advice services to be described hereinafter are shown in block diagram form in FIG. 6. Further discussion of why monitors are necessary is presented later.

Figure 6:
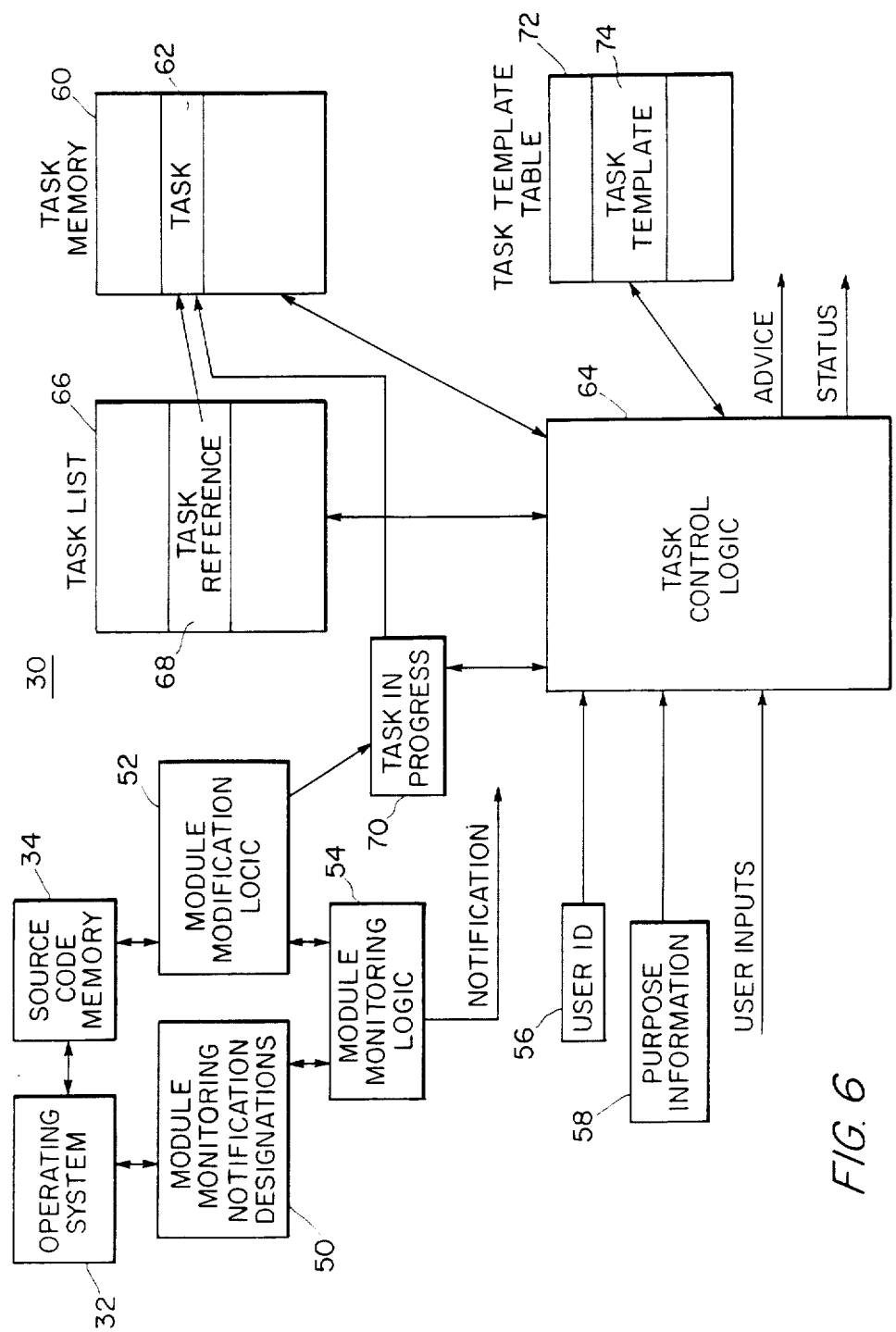
FIG. 6 is a simplified block diagram showing the additions to the block diagram of FIG. 3 utilized to provide the monitoring and task reporting capabilities of the present invention.

As can be seen in FIG. 6, to monitor changes to modules which could affect them, programmers using DSEE can enter monitoring requests to a table of module monitoring notification designations 50. In the usual manner, the system includes module modification logic 52, which makes the changes to the interleaved deltas of the source listing table 34 to create new versions, which was previously discussed. For purposes of the module monitoring functions of the present invention, module monitoring logic 54 is provided. It interfaces with the module modification logic 52 and the table 50 to provide notification to other users of the system concerning module modification completions. Typically, these are in the form of messages sent over the network and addressed to the users designated on the table 50 and indicating, inter alia, what has been changed, why the change was made, who made the change, and the time/date of the change. Note that, for purposes of the module monitoring and task monitories functions, the DSEE system queries the user and receives a user identification 56 at each computer 30 comprising a node or station on the network where the present invention is typically employed. The user is asked to provide purpose information which is saved at 58 for later use, for example, in notification messages from the monitoring logic 54.

While the above-described module monitoring capability is important, the task monitoring capability of the CASE system of the present invention provides a powerful tool for use in controlling a large scale system development by multiple programmers. Each user is assigned a task list 66 in memory for referring to tasks 62 for which they are responsible and which are stored in a task memory 60. Basically, a task is a list of subtasks or processes (i.e. builds) that must be accomplished to complete the task. Each task 62 comprises a "TO BE DONE" portion listing the subtasks that comprise the task and a "Done" portion wherein the subtasks are listed as they are accomplished. Tasks 62 can be entered onto the task list 66 by a user via task control logic 64. Tasks 62 can also be entered by a supervisor, or the like, in the distribution of work by way of an inter-computer message over the network. As part of the sign-on process, the user is asked to identify the task in progress, which is stored at 70. This gives the structure necessary to monitor basic task accomplishment. For example, the modification of a module to a new version might be a subtask of a task 62 to which task reference 68 is pointing. At the time that the module modification logic 52 makes the change to a source module in the source code memory 34 to store the new version for use, the logic 52 calls task control logic 64 to check for the task in progress 70, if there is none (i.e. the change in the module is not part of a task), no further action is taken. If, however, the change is part of a task, the task in progress indicator 70 identifies the task 62 involved. From there it is a simple matter for the control logic 64 to add the change to the module to the end of the "DONE" portion of the appropriate task 62.

To provide additional support, a task template table 72 is provided wherein task "templates" 74 are maintained. The templates 74 provide the ability to maintain the predefined skeletons of tasks that are used on a regular basis, for example, so that to define the task for any particular use, all that is required for the user is to fill in the blanks with specific item names and identifiers.

These concepts as actually implemented in the DSEE CASE system will not be described in detail.

To effectively manage a large Task, a software development environment needs a convenient way to record all related sub-Tasks performed by any number of persons on any of the nodes in the workstation network. DSEE provides Tasks and Tasklist monitoring for this purpose. A DSEE Task is a structure used to plan and record the low-level steps involved in a high-level activity. A task consists of a title, which describes the high-level activity, and a list of textual items, which are the sub-Tasks that must be performed. Tasks are displayed graphically as having active items awaiting action, and completed items. The list of completed items is referred to as the "transcript". A user has a current Task as part of his per-window context. The current Task is orthogonal to the current library, so the user can switch from a code library to a design or documentation library as part of the same current Task.

The History Manager interacts directly with the Task Manager by "tagging" each newly created version of an element with a reference to the current Task. Later, a user looking at a single element modification can easily find and examine all the related modifications which were a part of a given Task. When the HM records a user's modification comments for a new version, it sends a copy of the comment (along with the library name, element name, user name and time) to the transcript of the current Task. This provides for more useful "audit trails", organized by Task, as compared to the History Manager's typical audit trails, which list all modifications to one library. Tasks reside in libraries, and normally are not deleted upon completion, since the task transcript contains information that may prove useful long after the Task is completed.

Besides element modification information, other items in the Task may describe an activity which was part of the Task (e.g. "Call customer x.", or "Run the new system through Q/A."). A Graphic Task Editor is provided, which allows a user to add a new active item or delete an item which is determined to be unnecessary, and to "check off" an active item that has been completed—which moves the item from the Task's Active list to the transcript.

DSEE Tasklists contain references to Tasks. A Tasklist serves as a list of high-level activities that need to be done. Each user has a personal Tasklist, and each library contains two Tasklists—one for Active Tasks, and one used mainly for Completed Tasks. For flexibility in project organization, an arbitrary number of additional Tasklists may be created. A Task may be referenced by several Tasklists if several people need to take part in its completion. In this case, each user sees items Completed by other users immediately, since Tasklists contain references to Tasks, rather than the Tasks themselves. Users may also add Task references to other users' Tasklists, subject to access control considerations.

When a user has finished with his part of the Task, he removes the Task reference from his Tasklist. When no Tasklists reference the Task and all of the Active items have been Completed and "checked off", the Task is completed. The Task is typically not deleted, however, since it contains a record of all the sub-Tasks that were performed for the Task, which is potentially useful information. For example, the project leader may wish to examine the Completed Task to verify that it was correctly performed. Bug fixes may require knowing what steps were part of the Task. A Complete Task can also serve as a guide for future, similar, Tasks; for instance, a Completed Task entitled "Add the 'foo' command to the user interface" could provide a useful outline for a new programmer who was instructed to "add the 'bar' command to the user interface". This latter novel capability is called "advice" in the DSEE system, and is discussed in more detail hereinafter.

Technical Notes of Task Management

Because DSEE was particularly designed for use in a distributed environment, special attention was given to the implementation of Task and Tasklist operations which may involve more than one node in the workstation network. For example, if a user creates a new version of an element, the event is recorded in the Task Transcript of his current Task. However, the library where the new version is created may be on a different node than the library where the Task is stored. This could present a problem if the network is partitioned when the new version is created: specifically, how will the Task Transcript be updated? DSEE would not be a very supportive environment if it disallowed the creation of the new version when the network was partitioned. Therefore, a reliable store and forward message passing utility is provided to guarantee that the update will occur. Of course, there will be a delay between the creation of the new version and updating the Task Transcript if the network is partitioned, otherwise, the update occurs immediately. The store and forward mechanism is used similarly in other operations which access objects on different nodes in the network.

Besides providing reliable delivery of messages to other nodes on the network, the store and forward function provides the capability for sending messages across inter-network gateways. Therefore, the DSEE architecture allows for a Task to be referenced by users on more than one Apollo-compatible local network.

Advice Management

Often, a user needs to perform a Task which is quite similar to a Task that someone has performed before. The example of adding a new command to a user interface was mentioned previously. Many of the same modules in the system may need to be changed, the same chapters in the design document and user manual may need to be updated, and the same customer might need to be called on the telephone. Examination of the earlier Task Transcript can be helpful in determining the steps necessary to Complete the new Task.

The DSEE Advice Manager helps to manage common Tasks. The main component of a "piece of Advice" is the "Task Template". A Task template is similar to a Task, but contains no Completed items, only model Active items. Hence, Task templates are models from which Tasks are built. New Tasks may be instantiated from Task templates. When a new Task is instantiated, it inherits all of the model Active items from the Task template. As work proceeds, items in the Tasks are completed and moved to the Transcript, as usual.

The simplest type of Advice is the "Form", which is a named Task template. Forms may be created from scratch, or may be copies from Tasks. When they are copied from Tasks, all Transcript items in the Task become Active items in the Form. A command is provided to instantiate a new Task from a Form. To understand this concept more clearly, consider the example used above. Let us assume that when the Task entitled "Add 'foo' command to the user interface" was completed, the project leader created a Form from the Task, and stored it in a file called "add new command" in a project Advice directory. The Form may be edited to generalize it from how to add the 'foo' command to how to add any new command. Later, when the 'bar' command is to be added to the user interface, a new Task entitled "Add 'bar' command" could be instantiated from the "add new command" Form. The new Task could then be edited to make it specific to the particular Task at hand.

Forms are a simple type of Advice that make it easy to manage Tasks that are similar to other Tasks. A more intricate type of Advice is described hereinafter.

Monitoring Dependency Relationships

Many software development environments have some mechanism for tracking "build" dependencies; i.e., there is some way to detect when a module needs to be rebuilt because one or more of its constituents has been modified. MAKE, MMS, and Cedar all provide automatic building functionality, as does the DSEE Configuration Manager (discussed earlier). There is another type of dependency tracking, however, which is not addressed by any of the prior art CASE systems, and which is more people-oriented than build-oriented. Users should be able to define dependencies on elements such that other users will be informed of those dependencies before modifying the elements, and such that the user defining the dependency will be informed when the elements are modified. This unique capability is provided by the DSEE system.

The type of dependencies that require automatic notification involve "semantic dependencies", which cannot be detected by builders or other software tools, but can be detected virtually only by people. Communication between developers is necessary to properly track such dependencies. Unfortunately, most software development organizations have imperfect communication paths—a problem which is particularly acute in large scale software development efforts where many persons work on the different phases of product development such as design, implementation, quality assurance, demonstration, release coordination, etc. The problem is best demonstrated by a few examples:

Technical documents' dependence on implementation When the programs that implement the user interface for a system are modified, the system's "HELP" files and user documentation may need to be changed. Therefore, the technical writers for the product need to be notified.

Inter-module semantic dependencies: Programmers sometimes design code that depends on functionality in a module that is not reflected in the procedural interface. For instance, some modules might depend on the fact that a certain command line parser always converts the command line to uppercase. Before modifying the parser, it would be helpful to know that certain modifications would cause problems for other modules that depend on the parser. Incompatible changes could be avoided by consulting with the user who declared the dependency before making any changes. With or without consultation, the implementer of the dependent module needs to be notified when a semantic dependence may have been violated. Note that an automatic builder wouldn't give advanced warning, or even detect the problem described. Furthermore, the problem isn't simply one of rebuilding; the modules which used the parser routine would have to be modified to no longer exploit their dependency on uppercase command lines.

The "Common Module" Problem: Suppose the programs for two products share a common module, but the products are maintained by separate implementation groups, e.g. a common back-end for a family of compilers. There is a "build" dependency involved here; but, note the difference between this problem and the problem addressed by automatic builders. When one group changes the common module, then, the automatic builder correctly rebuilds that group's system. The other group's system will be correctly rebuilt the next time they invoke the automatic builder; but, they may be working on another project and not even know that their system needs to be rebuilt. They need to be notified, so they can invoke the automatic builder to rebuild their system. For complete automation of this type of dependency tracking, it might even be desirable for the automatic builder to be automatically invoked for both systems whenever the common module was changed.

Certainly, other examples can be found. What it points out, however, is that a flexible solution is needed to address the general problem of dependency tracking with automatic notification. DSEE provides this unique and novel capability.

DSEE provides for setting Monitors on elements; and, the DSEE Monitor Manager tracks the dependencies defined by the Monitors that users create. A Monitor may contain a piece of Advice (i.e. a Task Template) and a list of Tasklists to receive that Advice. It may also contain a list of activation commands, executable by the shell. When a user creates a Monitor, he enters comments describing the dependency involved. A Monitor is set on one or more elements in a DSEE library—referred to as the "Target elements" of the Monitor. When some user RESERVEs a Monitored element, he is informed by DSEE that the element is monitored and is shown the description of the dependency and the name of the user who declared the Monitor. This way, the element won't be modified without first considering dependency.

A Monitor is activated when a new version is created for any of the Target elements. When a Monitor is activated, a new Task is instantiated from the Task Template and a reference to the new Task is added to each Tasklist named by the Monitor. The users who had the dependency are therefore advised that they should check the new version to see if their dependency is still met. The new Task instantiated from the Monitor's Task Template advises them about what to do.

If the Monitor contained executable commands, they are automatically executed when the Monitor is activated. For the "common module" example above, activation commands could be used to automatically invoke the automatic builder to rebuild any or all of the systems which use the common module.

The automatic notification basically adds a new Task reference to a user's Tasklist. Of course, the user must look at his Tasklist in order to notice that the Monitor was activated. For users who examine their Tasklists infrequently, DSEE provides a Tasklist alarm server, which "watches" Tasklists specified by the user. When some user activates a Monitor by modifying an element and other users are notified by a new Task reference on their Tasklists, the alarm server notices and pops up or displays small windows on the screens of the notified users, informing them that they have a new Task. The title of the task is also displayed.

Thus, it can be seen from the foregoing description that the present invention has truly provided its stated objects.

Wherefore, having thus described our invention, we claim:

1. A computer device for building a software system having a sequence of components, the device comprising:
   (a) computer means for executing pre-established logic sequences and for reading from and writing to memory;
   (b) source code memory means for storing a basic source code for each component of a plurality of software systems, each component comprising a plurality of sequential statements, and for storing, for each basic source code of a component, a sequence of modifications to the respective source code, each modification defining a different version of the respective component and being identified by a version number;
   (c) build list means for designating the sequence of said component of a desired software system to be built;
   (d) version list means for listing on a rule basis user desired possible versions of each of said components of the desired software system to be built;
   (e) version designation means for dynamically designating on a component-by-component basis the version number to be currently employed during the building of said desired software system;
   (f) GET statement logic sequence means to be executed by said computer means for accessing the source code memory means and for providing on request the next statement in sequence of a designated version of a component in the source code memory means according to the version currently designated by said version designation means;
   (g) derived object pool memory means for receiving and holding translated components of said desired software system as the system is being built; and
   (h) system build logic sequence means to be executed by said computer means for establishing from said build list means and said version list means a sequence of components by version numbers, corresponding to rule satisfying versions of the components, to be used to build the desired software system, for periodically setting said version designation means to reflect the version number of a component to be currently translated by any one of different translators supported by the computer means, for sequentially accessing said GET statement logic sequence means to sequentially obtain the rule satisfying versions of the components on a statement by statement basis from the source code memory means, and for using said statements to build from the translated components the desired software system comprising the designated components and rule satisfying versions thereof in said pool memory area.

2. The computer device of claim 1 wherein:
   said system build logic sequence means includes logic to use the most recent version of a component if no version number is designated by said version designation means.

3. The computer device of claim 1 further comprising:
   (a) bound configuration memory for holding build histories of built software systems as Historical Records, where
      said system build logic sequence means, as part of the building of each software system, creates a build history in said bound configuration memory comprising a list of the components and versions employed to build the system, each build history identified by a unique Historical Record identifier; and
   (b) build list designation logic sequence means, to be executed by said computer means for accessing said bound configuration memory and using a user designated Historical Record build history in conjunction with the build list means and said version list means to designate the version of a component of a to-be-built software system, such designation recreating a prior built software system from only said unique Historical Record identifier.

4. The computer device of claim 3 wherein:
   said bound configuration memory is contained within said derived object pool memory means.

5. The computer device of claim 1 further comprising:
   (a) bound configuration memory for holding build histories of built software systems as Historical Records, each build history including a unique identifier for identifying each translated component created by the translating of a version of a component with a respective executed logic entry in said system build logic sequence means;
      said system build logic sequence means, as part of the building of each software system, creating a build history in said bound configuration memory comprising a list of the components and versions employed to build the software system and said unique identifier; and said system build logic sequence means, as part of the building of each software system, checking said Historical Records for each logic entry in the system build logic sequence and utilizing a previously created translated component having an executed logic entry corresponding to a logic entry in the logic sequence rather than utilizing source code for said logic entry to create said translated component, the previously created translated component existing within said pool memory means.

6. The computer device of claim 1 wherein:
   (a) said drived object pool memory means is adapted to have a plurality of systems built within it at one time; and,
   (b) said system build logic sequence means is adapted to concurrently employ a plurality of said build list means and said version list means simultaneously to build a plurality of said software systems within said derived object pool memory means simultaneously.

7. The computer device of claim 6 further comprising:
   a bound configuration memory for holding build histories of built software systems as Historical Records, each build history including a unique identifier for associating each translated component created from the translating of a version of a component with a respective executed part of said system build logic sequence means;
   said system build logic sequence means, as part of the building of each software system, creates a build history in said bound configuration memory comprising a list of the components and versions employed to build the system and said unique identifier; and
   said system build logic sequence means, as part of the building of each software system, checks said Historical Records for each part to be executed of the system build logic sequence means and utilizes a previously translated component corresponding to a said part to be executed, rather than utilizing the source code for said part to be executed, said translated component existing within said pool memory means.

8. The computer device of claim 7 wherein:
   (a) said Historical Records include last time used means for indicating times of last utilization of translated components; and additionally comprising,
   (b) purge logic sequence means to be executed by said computer means for periodically checking said last time used means and for purging from said pool memory means translated components that have not been utilized within a preset period of time.

9. The computer device of claim 1 further comprising:
   (a) module modification logic sequence means to be executed by said computer means for modifying and thereby generating new versions of components in said source code memory means by adding to said sequence of modifications in said source code memory means;
   (b) monitors coupled with selected components of said source code memory means, the monitors designating notifications to be made when modifications are made to said components which have been selected for monitoring; and,
   (c) module monitoring logic means for establishing module monitoring information and notification designations of said monitors, the module monitoring logic means interfacing with said module modification logic sequence means, and making notifications according to said designations of monitors when a modification to respective components being monitored is made.

10. The computer device of claim 9 further comprising:
    (a) task designation logic sequence means to be executed by said computer means for designation sequences of subtasks to be accomplished as tasks;
    (b) task memory means for holding said task designations from said task designation logic sequence means; and
    (c) task control logic sequence means to be executed by said computer means for automatically putting subtask completion information into said task memory means, for interfacing with said module modification logic sequence means, the task control logic sequence means putting subtask completion information into said task memory means when a new version of a component is created by the module modification logic sequence means.

11. A computer device for building software systems having a plurality of elements, each element comprising a sequence of logic statements, the device comprising:
    an operating system having at least one computer language translator;
    source code memory means for storing versions of elements of various software systems;
    a system model providing an indication of elements and a sequence of the elements to be used to build a desired software system;
    a configuration thread providing a rule-based indication of user chosen possible versions of each element of the desired software system;
    a version designator table for providing the translator an indication of the version of an element to be currently translated, the table being settable in a manner so as to dynamically provide an indication of version of an element on an element by element basis during the building of the desired software system; and
    a system builder combining and evaluating the indications of the system model and configuration thread to form a bound configuration thread for the desired software system, the system builder determining a version of an element in the system model and setting the version designator table to indicate the version of the element according to the bound configuration thread, such that as the version of an element is indicated by the table, the system builder enables the operating system to read form the source code memory means the version of the element indicated by the table and enables the translator to translate the version of the element, the system builder setting the version designator table for each element of the desired software system.

12. A computer device as claimed in claim 11 wherein the source code memory means stores versions by recording for each element a sequence of modifications to the element, each modification in the sequence defining a different version of the element and being identified by a version number; the operating system reading and applying the sequence of modifications during a reading of a version of return the respective version from the source code memory means.

13. A computer device as claimed in claim 12 wherein the version designator table provides an indication of the version of an element by a version number which is used by the operating system to read directly a certain version.

14. A computer device as claimed in claim 11 wherein a bound configuration thread of a previously built software system is used in the configuration thread to provide an indication of versions of elements in the desired software system.

15. A computer device as claimed in claim 11 further comprising a derived object pool in which translated elements are stored along with their respective bound configuration threads.

16. A computer device as claimed in claim 15 wherein the system builder compares the bound configuration thread formed for a to-be-built desired software system with bound configuration threads in the derived object pool to determine which elements of the to-be-built desired software system are to be currently translated and which elements have corresponding translations in the pool that may be used in the building of the desired software system.

17. A computer device as claimed in claim 15 wherein the derived object pool is a cache memory.

18. A computer device as claimed in claim 17 wherein the translated elements stored in the derived object pool are purged in order of least recently used to most recently used.

19. A computer device as claimed in claim 11 further comprising:

monitor means coupled with user selected versions of elements in the source code memory logically means for providing notification, to a respective user, of modifications of the selected versions of elements.

20. A computer device as claimed in claim 11 wherein the system builder enables the operating system and translator to translate elements of more than one desired software system at a time using in common the source code memory means, the system builder dynamically setting the version designator table accordingly.

* * * * *

UNITED STATES PATENT AND TRADEMARK OFFICE
CERTIFICATE OF CORRECTION

PATENT NO. : 4,809,170

DATED : February 28, 1989

INVENTOR(S) : David B. Leblang, Gordon McLean, Jr., Howard Spilke and Robert P. Chase, Jr.

It is certified that error appears in the above—identified patent and that said Letters Patent is hereby corrected as shown below:

Claim 6, Column 21, line 16, delete "drived" and insert instead ---derived---.

Claim 19, Column 24, line 13, after "memory", delete "logically".

Claim 19, Column 24, line 12, after "means" should read --logically coupled--.

Signed and Sealed this

Nineteenth Day of December, 1989

Attest:

JEFFREY M. SAMUELS

Attesting Officer     Acting Commissioner of Patents and Trademarks